(12) United States Patent
Campbell et al.

(10) Patent No.: US 8,210,116 B2
(45) Date of Patent: Jul. 3, 2012

(54) WATERCRAFT WITH HULL VENTILATION

(75) Inventors: Lorne F. Campbell, Broadstone (GB);
Steven C. H. Loui, Honolulu, HI (US);
Mealani Parish, Mililani, HI (US)

(73) Assignee: Navatek, Ltd., Honolulu, HI (US)

(*) Notice: Subject to any disclaimer, the term of this patent is extended or adjusted under 35 U.S.C. 154(b) by 142 days.

(21) Appl. No.: 12/876,208

(22) Filed: Sep. 6, 2010

(65) Prior Publication Data

US 2011/0056425 A1    Mar. 10, 2011

Related U.S. Application Data

(60) Provisional application No. 61/241,390, filed on Sep. 10, 2009.

(51) Int. Cl.
  *B63B 1/32* (2006.01)
(52) U.S. Cl. .......................... 114/290; 114/291
(58) Field of Classification Search ............... 114/291, 114/290
  See application file for complete search history.

(56) References Cited

U.S. PATENT DOCUMENTS

| | | | |
|---|---|---|---|
| 3,316,874 A | 5/1967 | Canazzi | |
| 4,091,761 A | 5/1978 | Fehn | |
| 4,231,314 A | 11/1980 | Peters | |
| 4,862,817 A * | 9/1989 | Hornsby et al. | 114/67 A |
| 5,415,120 A | 5/1995 | Burg | |
| 5,452,676 A | 9/1995 | Fiore | |
| 5,570,650 A | 11/1996 | Harley | |
| 6,216,622 B1 | 4/2001 | Lindstrom et al. | |
| 6,293,216 B1 | 9/2001 | Barsumian | |
| 6,868,798 B2 | 3/2005 | Robinson et al. | |
| 6,925,953 B1 | 8/2005 | Batista et al. | |
| 6,983,713 B1 | 1/2006 | Robinson et al. | |
| 7,093,553 B2 | 8/2006 | Robinson et al. | |
| 7,418,915 B2 | 9/2008 | Campbell | |

(Continued)

FOREIGN PATENT DOCUMENTS

FR    2 621 551 A1    4/1989

(Continued)

OTHER PUBLICATIONS

Hollister, Stephen M., Automatic Hull Variation and Optimization, The Society of Naval Architects and Marine Engineers, New England Section, Feb. 28, 1996, www.newavesys.com\hullvary.htm.

(Continued)

*Primary Examiner* — Stephen Avila
(74) *Attorney, Agent, or Firm* — Goodsill Anderson Quinn & Stifel, LLP

(57) ABSTRACT

An engine-powered watercraft includes three parallel hulls, namely a center hull with two or more transverse steps, and two smaller outer hulls or amas on either side of the center hull that are configured to form two vent ducts on either side of the center hull, disposed between the center hull sides and the amas. The amas, steps and vent ducts are disposed along the length of the watercraft and are configured to enable high speed capability and to facilitate pressurization of the vent ducts. The pressurized vent duct maximizes ventilation of the running bottom of the watercraft so as to improve efficiency and to reduce drag thereon. The pressurized vent duct creates an area of lift at the widest, aft-most points of the running bottom, which thereby results in improving the transverse and longitudinal stability of the watercraft and in reducing the trim for better seakeeping.

22 Claims, 16 Drawing Sheets

U.S. PATENT DOCUMENTS

| | | | |
|---|---|---|---|
| 7,814,853 B2 * | 10/2010 | Adams | 114/43 |
| 7,845,301 B2 * | 12/2010 | Loui et al. | 114/284 |
| 2005/0016435 A1 | 1/2005 | Robinson et al. | |
| 2005/0279269 A1 | 12/2005 | Robinson et al. | |
| 2006/0075954 A1 | 4/2006 | Robinson et al. | |
| 2007/0215029 A1 | 9/2007 | Campbell | |
| 2009/0241825 A1 | 10/2009 | Barsumian | |

FOREIGN PATENT DOCUMENTS

| | | |
|---|---|---|
| RU | 2139807 C1 | 10/1999 |
| SU | 0954304 A1 | 8/1982 |
| WO | 03/095297 A1 | 11/2003 |

OTHER PUBLICATIONS

Chryssostomidis, C. and M. Triantafyllou, Naval Architecture for Offshore Applications, Nov. 1981, http://ocw.mit.edu/courses/mechanical-engineering/2-019-design-of-ocean-systems-fall-2005/syllabus/offshore_design.pdf.

Michael Peters, Peters on (Fast) Powerboats, Part 2, Professional BoatBuilder, Oct./Nov. 2010, pp. 56-68.

Zhang, J., Chapter V. Ship Resistance (part 1)—PowerPoint presentation, Texas A&M University, Zachry Department of Civil Engineering, https://ceprofs.civil.tamu.edu/jzhang/oe402class/Chp5-part1.ppt, Oct. 23, 2006.

* cited by examiner

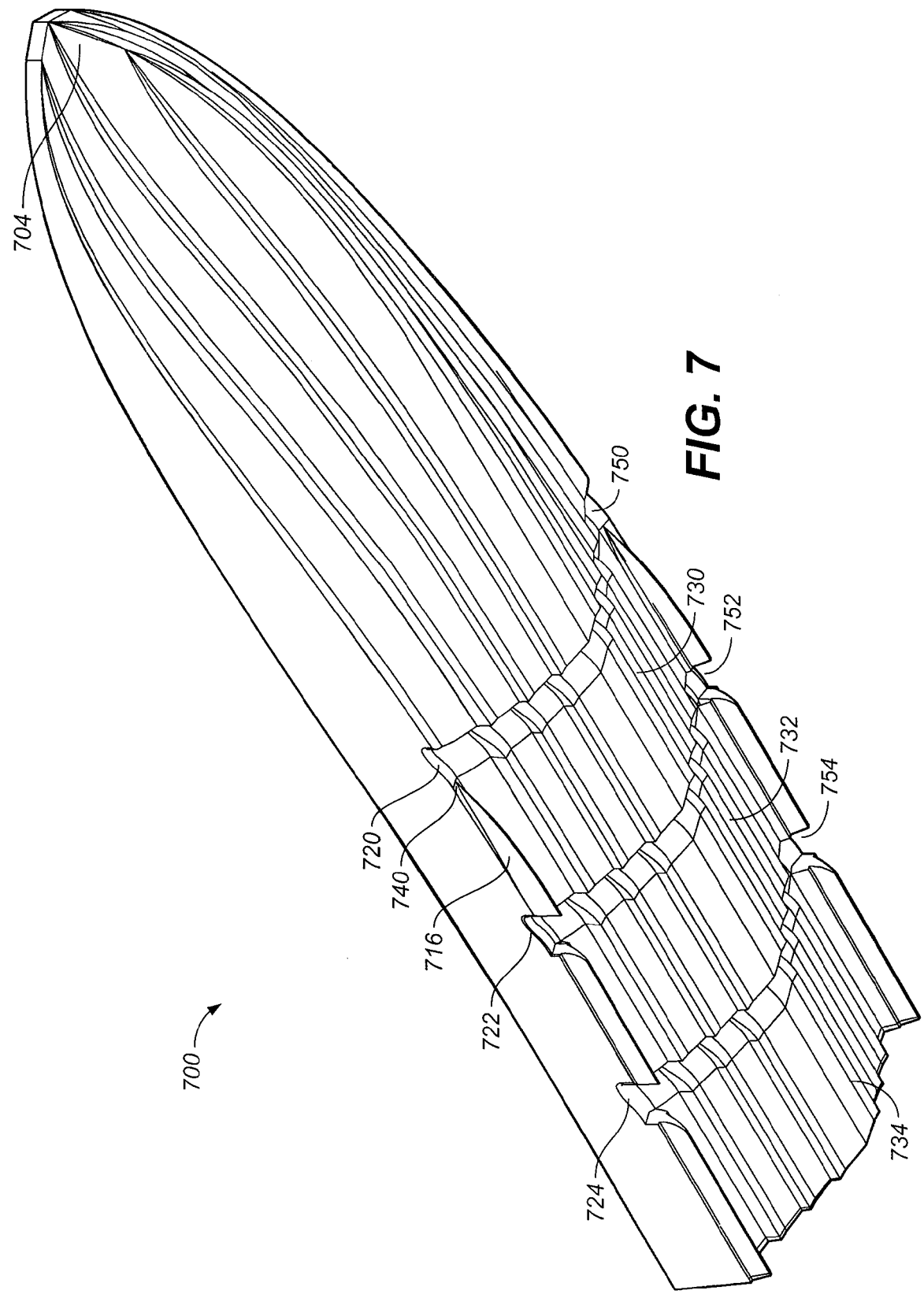

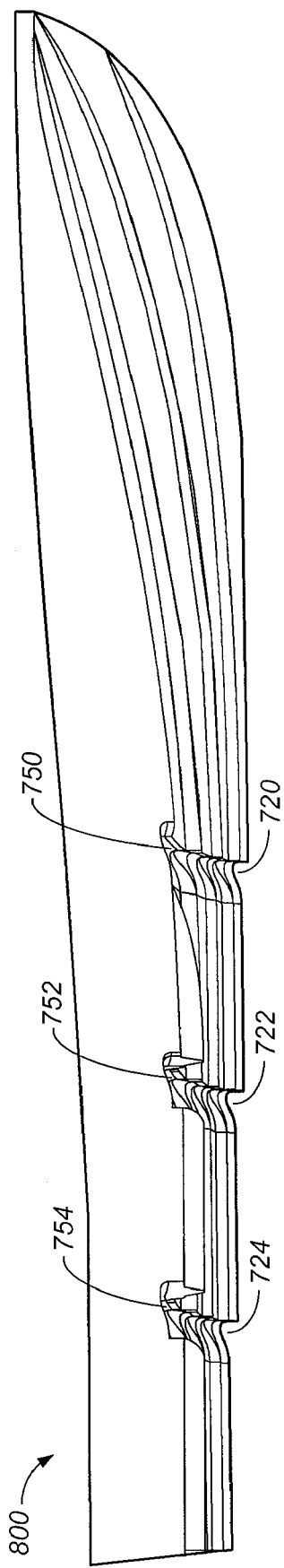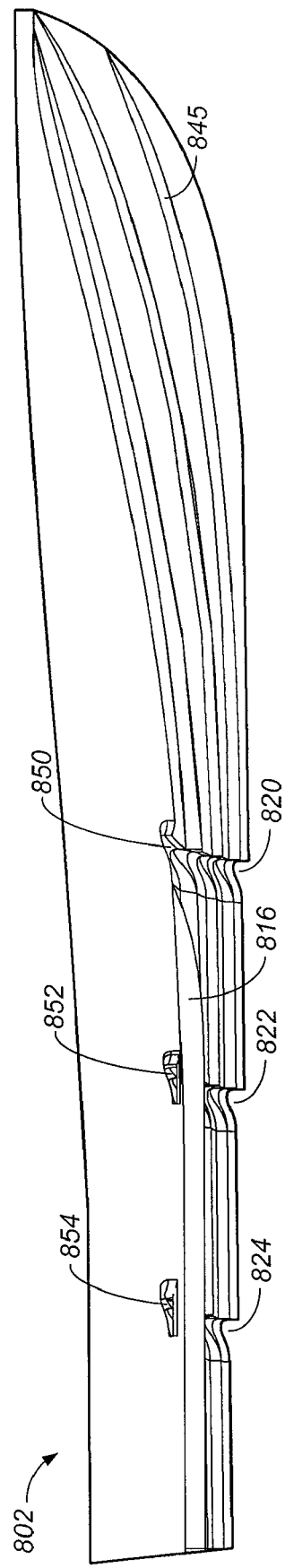

WATERCRAFT WITH HULL VENTILATION

CROSS REFERENCE TO RELATED APPLICATION

This application claims priority under 35 U.S.C. §119(e) from co-pending and commonly-assigned U.S. Provisional Application No. 61/241,390, filed on Sep. 10, 2009 by Steven C. H. Loui, et al., entitled "Watercraft with Hull Ventilation," the subject matter of which is fully incorporated by reference herein.

BACKGROUND OF THE INVENTION

1. Field of the Invention

The present invention relates generally to the field of watercraft hull configuration, and more particularly to an engine-powered watercraft having three parallel hulls, with the center of the three hulls being of a v-form having varying deadrise depending on the purpose of the craft and two or more transverse steps, and two outer hulls, i.e., amas, having considerably greater reverse deadrise facing the deadrise of the center hull and vertical outboard surfaces.

2. Description of the Background Art

Entrapment tunnels of the prior art typically either keep the entire tunnel completely wet or completely dry. There are drawbacks to both methods. For example, completely wetted tunnels experience increased drag. On the other hand, completely dry tunnels cause watercraft instability. It would be desirable to reduce viscous drag of a watercraft and contemporaneously improve the stability using a combination of allowing the tunnel to be both wet and dry, thereby overcoming such drawbacks.

In watercrafts with conventional stepped hulls, the steps can be ventilated using step cut-outs. The suction created by water separating and reattaching on the hull immediately aft of the step in the step cavity draws air in from the ambient surroundings via the step cut-outs. For this reason, it is normally desirable to leave the outboard openings of the step cut-outs without obstruction, that is, to ensure that ambient air is always free to flow into the step cavity. Also for this reason, stepped hulls are not typically used in combination with tunnels, channels, etc., since it is thought that these structures would interfere with the ventilation of the step cavities. It would be desirable for amas to be used in conjunction with stepped hulls. Amas improve static and dynamic stability, add planing lift, improve directionality, and provide a structural stand-off from the main hull, fendering the main hull from impacts at the waterline.

In prior art, if stepped hulls are used with amas, they are made in conjunction with adequately large air entrapment tunnels so that the flow of atmospheric air is not constricted from entering the step cavities. It would be desirable to remove the necessity of having large air entrapment tunnels when amas are used with stepped hulls, both to meet size constraints, as well as to reduce the drag and weight of a larger structure.

In view of the foregoing, it would be desirable to provide system, apparatus and methods to reduce drag and to improve stability for stepped planing watercrafts.

SUMMARY OF THE INVENTION

The present invention overcomes the deficiencies and limitations of the prior art by providing systems, apparatus, methods, and other embodiments to ventilate and to wet the vent ducts of a watercraft having a center hull flanked by a pair of amas disposed on either side of the center hull, the amas configured with the center hull to form a pair of vent ducts, and the center hull including at least two transverse steps in some embodiments and three transverse steps in other embodiments, such transverse steps extend from the center hull, across the vent duct, to end at the inboard face of the amas.

The amas, steps and vent ducts are configured for design length and speed to cause a pressurized vent duct that maximizes ventilation of the running bottom. Some embodiments utilize a water plug to achieve improved efficiency of the watercraft and reduction in viscous drag. A water plug, as used in this document, refers to a blockage formed between the hull surfaces and the free surface of the water. Although it is called a water plug, the plug may also include entrained air. The pressurized vent duct facilitates an area of lift at the widest, aft-most points of the running bottom. As a result, transverse and longitudinal stability of the watercraft is improved, and the trim is reduced for improved sea-keeping characteristics.

Advantages of the invention will be set forth in part in the description which follows and in part will be apparent from the description or may be learned by practice of the invention. The objects and advantages of the invention will be realized and attained by means of the elements and combinations particularly pointed out in the appended claims and equivalents.

BRIEF DESCRIPTION OF THE DRAWINGS

FIG. 7 depicts an isometric bottom plan view of a watercraft, according to at least some embodiments of the invention.

FIG. 8A shows a side elevation of a watercraft hull of FIG. 7, according to at least some embodiments of the invention.

FIG. 8B shows another side elevation of a watercraft of FIG. 7, according to at least some alternate embodiments of the invention.

The figures depict the described embodiments of the present invention for purposes of illustration only. One skilled in the art will readily recognize from the following discussion that additional embodiments of the structures and methods illustrated herein may be employed without departing from the principles of the invention described herein.

DETAILED DESCRIPTION OF THE DESCRIBED EMBODIMENTS

Figure 1:
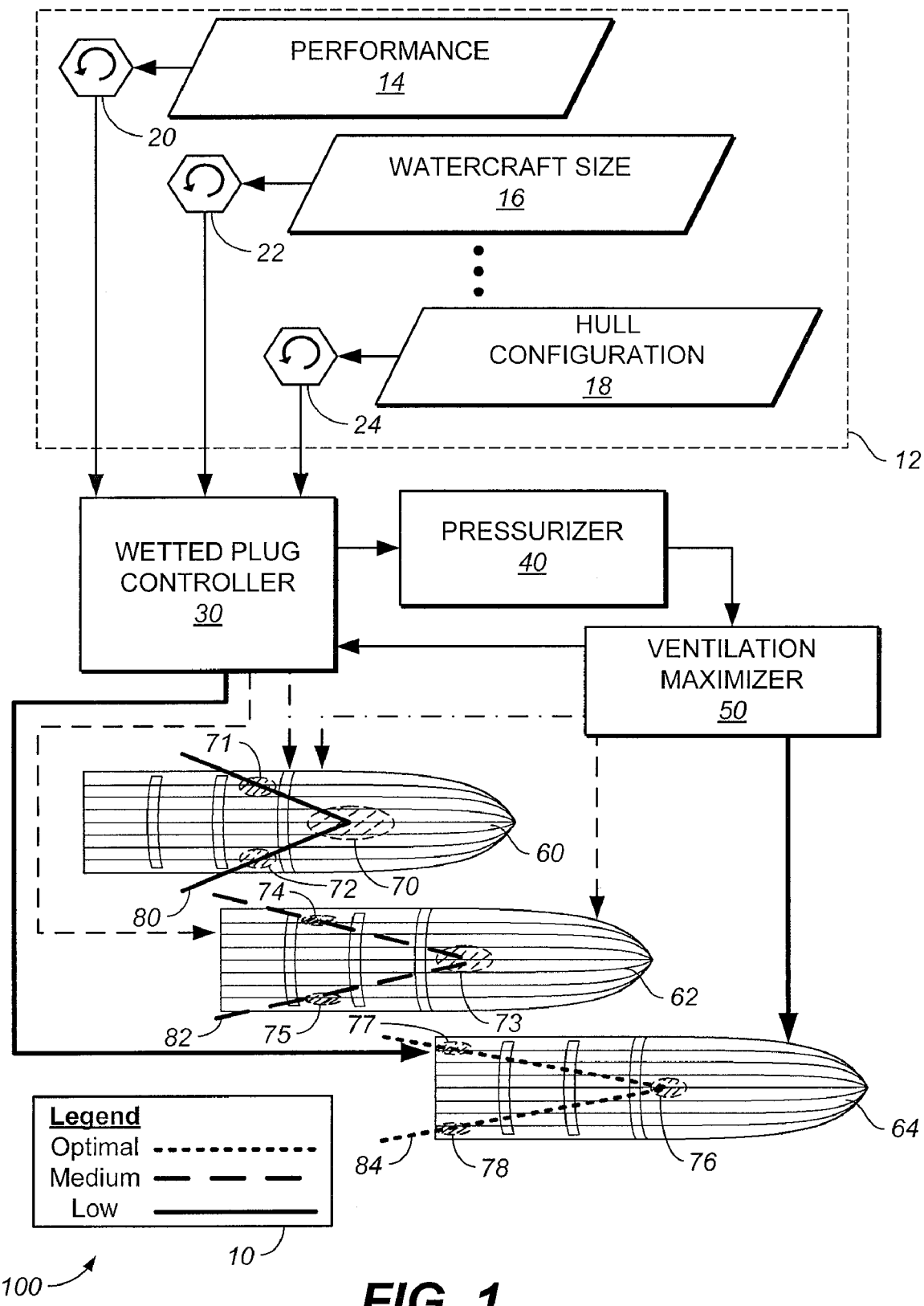
FIG. 1 is a diagram illustrating an exemplary system to construct and operate a watercraft, according to at least some embodiments of the invention.

Referring now to the drawings in detail, FIG. 1 is a diagram illustrating an exemplary system to construct and operate a watercraft, according to at least some embodiments of the invention. The watercraft is configured to operate to both ventilate and wet a pair of vent ducts so as to maximize ventilation on the center hull. Here, system 100 includes input data 12, wetted plug controller 30, pressurizer 40, and ventilation maximizer 50, which are configured to cause the pair of vent ducts (illustrated below) to be variably pressurized as the watercraft 60 travels at low speeds, to when watercraft 62 increases velocity, to when watercraft 64 reaches design speeds. Watercrafts 60, 62, and 64 are bottom plan views.

The wetted areas of the planing hull can be seen to form a wedge-shaped configuration, that is, one having an apex at the stagnation point where water first makes contact with the hull, and base points formed by the two water plugs. Divergent flow hitting the inboard surfaces of the amas forms a water plug in the vent duct, also creating regions of peak pressure in the area of the water plug. At lower speeds, apex 70 and water and water plugs 71, 72 form wedge 80 on the watercraft 60. At medium speeds, apex 73 and water plugs 74, 75 form wedge 82 on watercraft 62. At optimal speeds, apex 76 and water plugs 77, 78 form wedge 84 on watercraft 64.

When watercraft 60 is at lower speeds, less dynamic lift is created and the hull is lower in the water. Water plugs 71, 72 form in the vent duct forward of one or more of the step cut-outs. The full benefits of the water plug are not seen in these cases. However, the vent duct improves lift and acceleration in a similar manner to the water entrapment tunnels of prior art. The vent duct deadrise portion provides additional planing area, trapping low speed planing pressures to improve lift and acceleration to achieve critical planing speed. Steps forward of the water plug benefit from improved ventilation due to the presence of the water plug (as described herein). Steps aft of the water plug, as well as the vent duct itself, are unwet in the usual manner of stepped hulls due to the transverse steps extending from the center hull, across the vent duct, to the inboard faces of the amas.

As the watercraft 62 increases speed and more dynamic lift is created, allowing the hull to rise further out of the water, the vent duct progressively ventilates as the apex 73 of the wedge-shaped wetting pattern narrows, and its base of water plugs 74, 75 move further aft on the hull.

As watercraft 64 further accelerates and reaches optimal speeds, apex 76 narrows further and water plugs 77, 78 are formed in the region aft of the leading edge of the aft-most step, but forward of the transom. The full benefits of the water plug are seen here, bringing improved efficiency and increased stability to the watercraft hull. Water plugs 77, 78 serve to prevent air from flowing out of the vent duct, thus forcing air to travel inboard and recirculate on the hull, maximizing ventilation of the running bottom, as show in FIG. 9. Water plugs 77, 78 also pressurize air in the vent duct forward of the plug, thus facilitating flow from the vent duct inboard into the areas of lower pressure immediately aft of the steps in the step cavity, while also inhibiting air from moving beneath the center hull outboard to the vent duct. In the area where the water plug is formed, there is also an area of peak pressure (as discussed with FIGS. 11A-D), providing lift at the aft most, widest points on the hull, thus improving lateral and longitudinal stability and lowering the trim for more desirable seakeeping characteristics.

Above the optimal speeds, the wedge-shaped pattern of wetted areas narrows further, and the divergent flow does not intersect with the amas, such that no water plugs are formed. Under these conditions, the vent duct is fully ventilated, as with air entrapment tunnels of prior art.

As shown in FIG. 1, a Legend 10 indicates the solid line font of wedge 80 to represent low speed operational characteristics of the watercraft, a large dashed line font of wedge 82 to represent medium speed operational characteristics of the watercraft, and a dotted line font of wedge 84 to represent the optimal operational characteristics of the watercraft.

Input data 12 is shown to include a variety of input parameters that improve the stability of the watercraft and minimize the drag the watercraft experiences when operating from low, to medium and to optimal speeds. Some inputs include performance input data 14, watercraft size input data 16 and hull configuration input data 18, coupled respectively to variable selectors 20, 22, 24. To illustrate the function of variable selectors 20-24, examples will be explained, wherein it will be appreciated that such input data 12 may be adjusted. Controller 30 is configured to receive input data 12, which may include, but is not limited to, intake water, intake air and speed of the watercraft by way of examples. Other types of inputs may include the overall length of the watercraft, the overall beam, design speed, average deadrise of the hull, as well as parameters associated with transverse steps of the hull. Examples of such parameters include the quantity, length, beam, depth, deadrise and angle of attack associated with the transverse steps. In some examples, the aforementioned input data 12 may include information associated with the longitudinal steps or running strakes of a hull, such as the quantity, width, depth and deadrise. As will be described in further detail below, input data 12 may include information regarding the ama, in some embodiments. Examples further include the ama keel depth relative to the waterline and the center hull, beam, deadrise, width, shape, angle of attack and height of ceiling above the water line.

Figure 5:
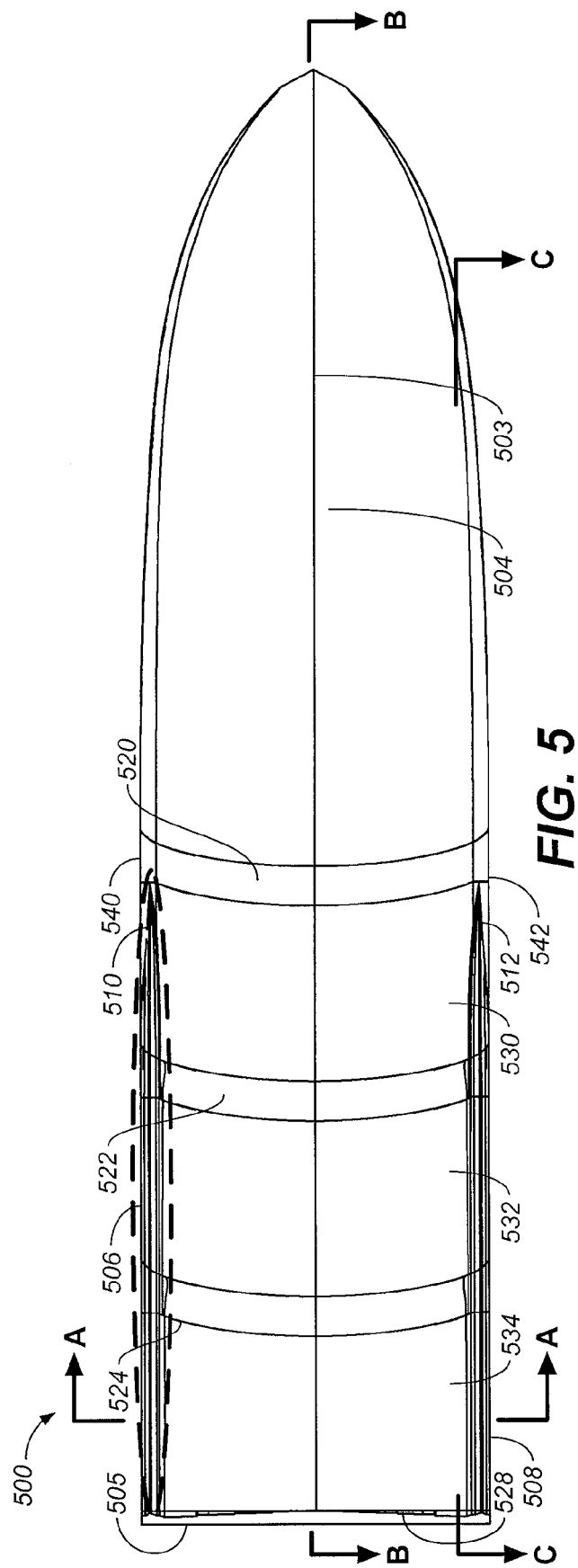
FIG. 5 is a bottom plan view of a watercraft, according to at least some embodiments of the invention.

Referring to FIGS. 1 and 5, wetted plug controller 30 enables vent ducts to be constructed and configured to continually feed air into the duct at the leading edge, that is, at the entry of the vent duct. In FIG. 5, a bottom plan view of a watercraft, is depicted according to at least some embodiments of the invention. Here, watercraft 500 includes a bow 503, a main hull 504 (referred to interchangeably as center hull 504), and a transom 505. Center hull 504 is disposed between two amas (i.e., outer or side hulls) 506, 508. The center hull 504 and ama 506 are configured to define a vent duct 510, while center hull 504 and ama 508 are configured to define vent duct 512. Vent ducts 510, 512 each run from aft of step cavities 520, to step cavities 522 and step cavities 524 towards the stern 528 and transom 505. Transverse steps 530, 532 and 534 extend from the center hull 504 across the vent duct deadrise surface portions on either side of the center hull 504 to end at the inner surfaces of the amas 506, 508. In some examples, step cavities 520, 522, 524 may be a hollowed out areas aft of each step. Although three step cavities and three transverse steps are depicted in a preferred embodiment, those skilled in the art will appreciate that the number of transverse steps and step cavities may vary. In some embodiments, the watercraft may include longitudinal steps, strakes and risers, and it will be appreciated that parameters representing these features will be considered in the construction of the watercraft configured to form the water plugs described herein. Section cut A-A represents a cross-section of hull 500, section cut B-B represents a Hull Symmetry Axis, and section cut C-C represents Hull Symmetry Axis Offset.

Still referring to FIGS. 1 and 5, wetted plug controller 30 controls the formation and position of the wetted plug. Controller 30 enables the vent ducts to be constructed and configured to continually feed air into the vent duct at a leading edge 540, 542 of the amas 506, 508, that is, at the entry of the vent ducts 510 and 512, respectively. The position of the wetted plug within the vent duct determines its effectiveness. For example, a wetted plug that is too far forward within the vent duct or that misses the hull altogether will not produce optimal performance. Additionally, the position of the wetted plug within the vent duct also determines the location of peak pressure which is useful in providing stability to the hull.

Figure 9:
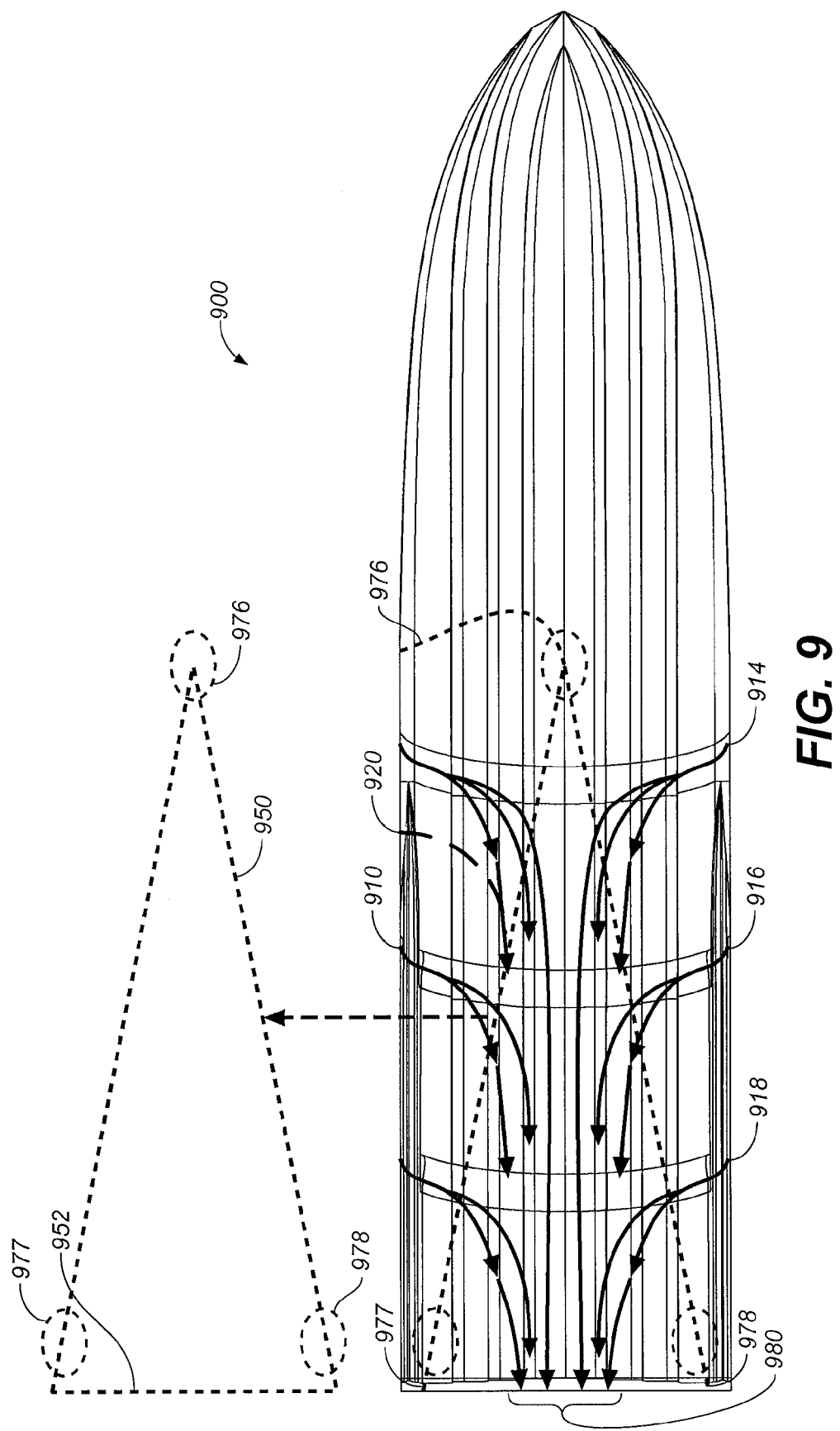
FIG. 9 depicts a bottom plan view of a hull, according to at least some embodiments of the invention.

Pressurizer 40 is configured to enable the vent ducts 510, 512 to become partially filled with air, the result of which causes back pressure within the vent duct due to the water plugs. In some examples, the vent ducts 510, 512 are capable of becoming pressurized because the water plug is formed at the aft end of the vent ducts and prevents air from flowing out of the aft end of the vent duct. The water plug thus causes back pressure of air within the vent duct forward of the water plug, creating a higher pressure than other transverse portions of the bottom of center hull 504, including the step cavities 520, 522 and 524. This further increases the pressure differential between the air in the vent ducts and the air in the step cavities, thereby inducing more air to flow into the step cavities and planing surface areas such as depicted in FIG. 9 which illustrates a bottom plan view of a hull, according to at least some embodiments of the invention. In FIG. 9, hull 900 is constructed to achieve water plugs 977, 978 which form the base 952 of wedge 950 having apex 976 at the stagnation point. Arrow flows 910 represent air being induced towards areas 920 facilitated by step cavities 914, 916, 918, which have lower pressure, and in the direction towards the transom and engine 980. Ventilation of the step cavities is advantageous in order to eliminate suction pressure that would otherwise exist aft of each step, and which would contribute to drag upon the hull.

Ventilation maximizer 50 is configured to block air from flowing out of the vent duct. The air is thus forced to recirculate on the hull running surfaces, which action enables maximum ventilation of the hull running bottom. Ventilation of the hull running surfaces, which is in addition to ventilation to the step cavities, is advantageous because it minimizes, viscous drag on the hull. While the smaller the wetted area, the less drag is experienced, it should be appreciated that embodiments avoid the situations of an extremely ventilated hull, which can become unstable due to very small wetted areas with concentrated high areas of pressure.

Figure 2A:
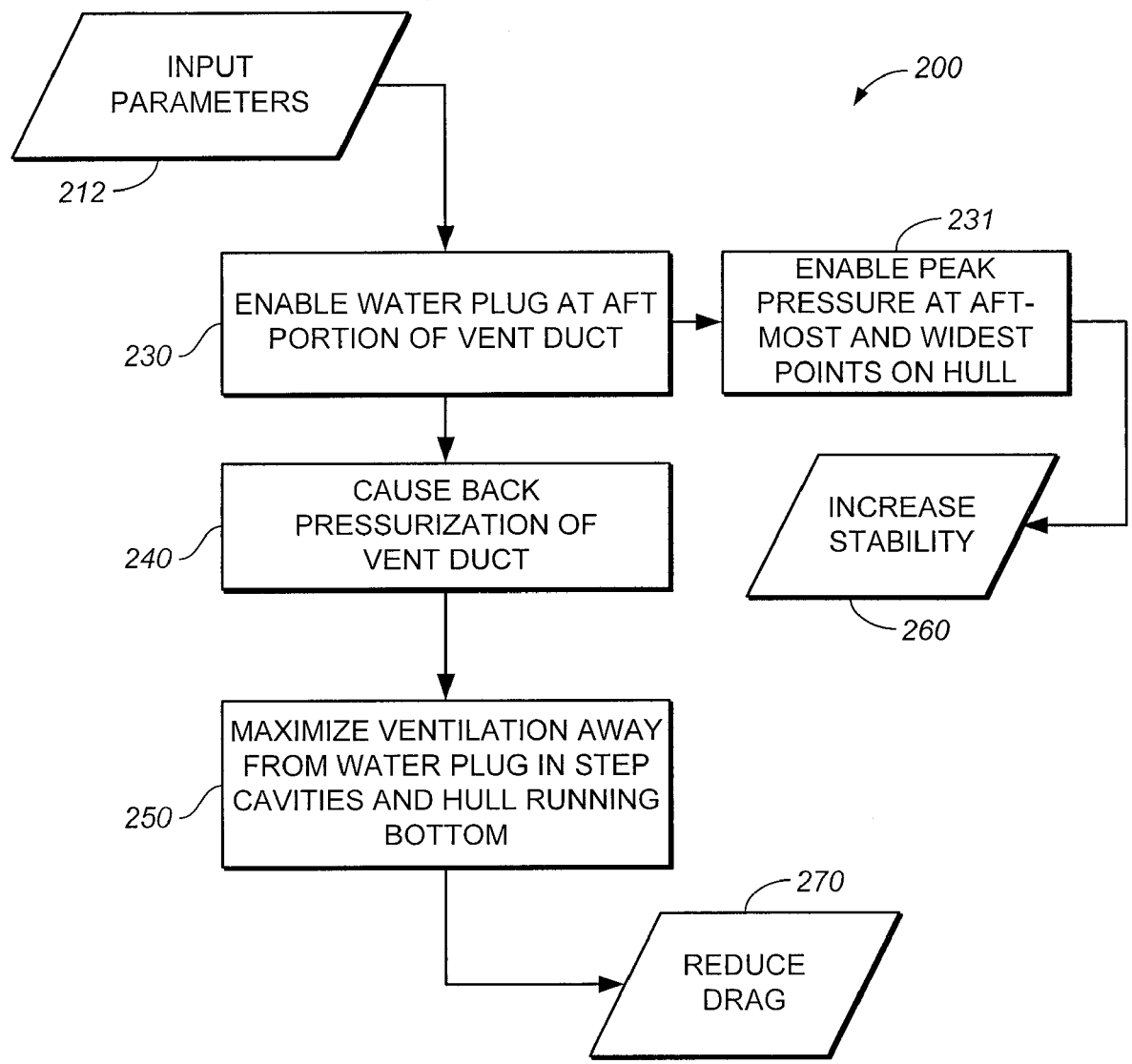
FIG. 2A illustrates a flow diagram of an exemplary method to construct a watercraft, according to at least some embodiments of the invention.

FIG. 2A illustrates a flow diagram 200 of an exemplary method to construct a watercraft, according to at least some embodiments of the invention. As shown, input parameters 212 are received (e.g., by wetted plug controller 30) at 230, wherein the watercraft is configured so that a water plug is enabled to be formed at the aft portion of a vent duct. The watercraft is configured so that the water plug creates an area of peak pressure 231, which provides lift at the aft-most and widest points on the hull commensurate to the wedge 84. The watercraft experiences improved lateral and longitudinal stability 260, along with the lowering of the trim for more desirable sea-keeping characteristics. At 240, the watercraft is constructed so that back pressurization of air within the vent duct is caused due to the water plug prohibiting air from escaping the vent duct near the transom of the watercraft. At 250, the watercraft is constructed to enable back pressurization to cause ventilation, wherein air in the vent duct is forced to travel inboard and to re-circulate on the hull, thereby maximizing ventilation away from the water plug and towards the running bottom of the center hull. This results in improved efficiency and in a reduction of viscous drag on the center hull 270.

Figure 2B:
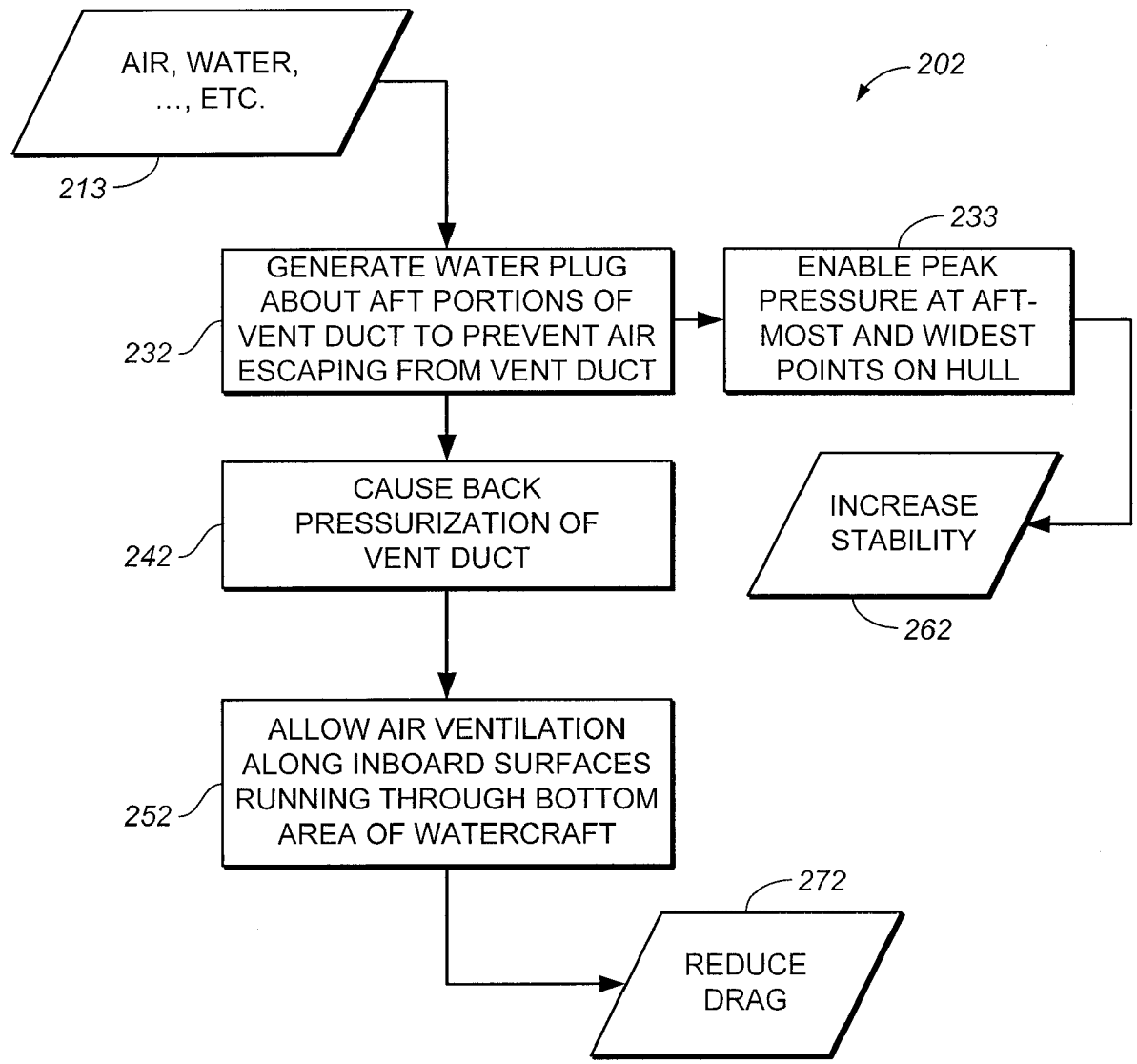
FIG. 2B illustrates a flow diagram of an exemplary method to operate a watercraft, according to at least some embodiments of the invention.

FIG. 2B illustrates a flow diagram 202 of an exemplary method to operate a watercraft, according to at least some embodiments of the invention. As shown, input parameters 213 may include air and water intake into the vent ducts. The watercraft is operated at 232 so that a water plug is generated about the aft portions of the vent duct aft of the leading edge of the aft-most step and forward of the transom. The water plug creates an area of peak pressure 233, which provides lift at the aft-most and widest points on the hull commensurate to the wedge 84. The watercraft experiences improved lateral and longitudinal stability 262, along with the lowering of the trim for more desirable sea-keeping characteristics. When the watercraft is operated at 242, back pressurization of air within the vent duct is caused, as previously described. At 252, the back pressurization causes ventilation to occur, wherein air in the vent duct is forced to travel along inbound surfaces and to re-circulate on the hull, thereby maximizing ventilation at the running bottom of the center hull. The pressurized air within the vent duct forward of the wetted plug may facilitate flow of air from the vent ducts towards areas of lower pressure beneath the center hull. The results are similar to that of FIG. 2A, wherein the watercraft experiences a reduction in drag at 272.

Figure 3:
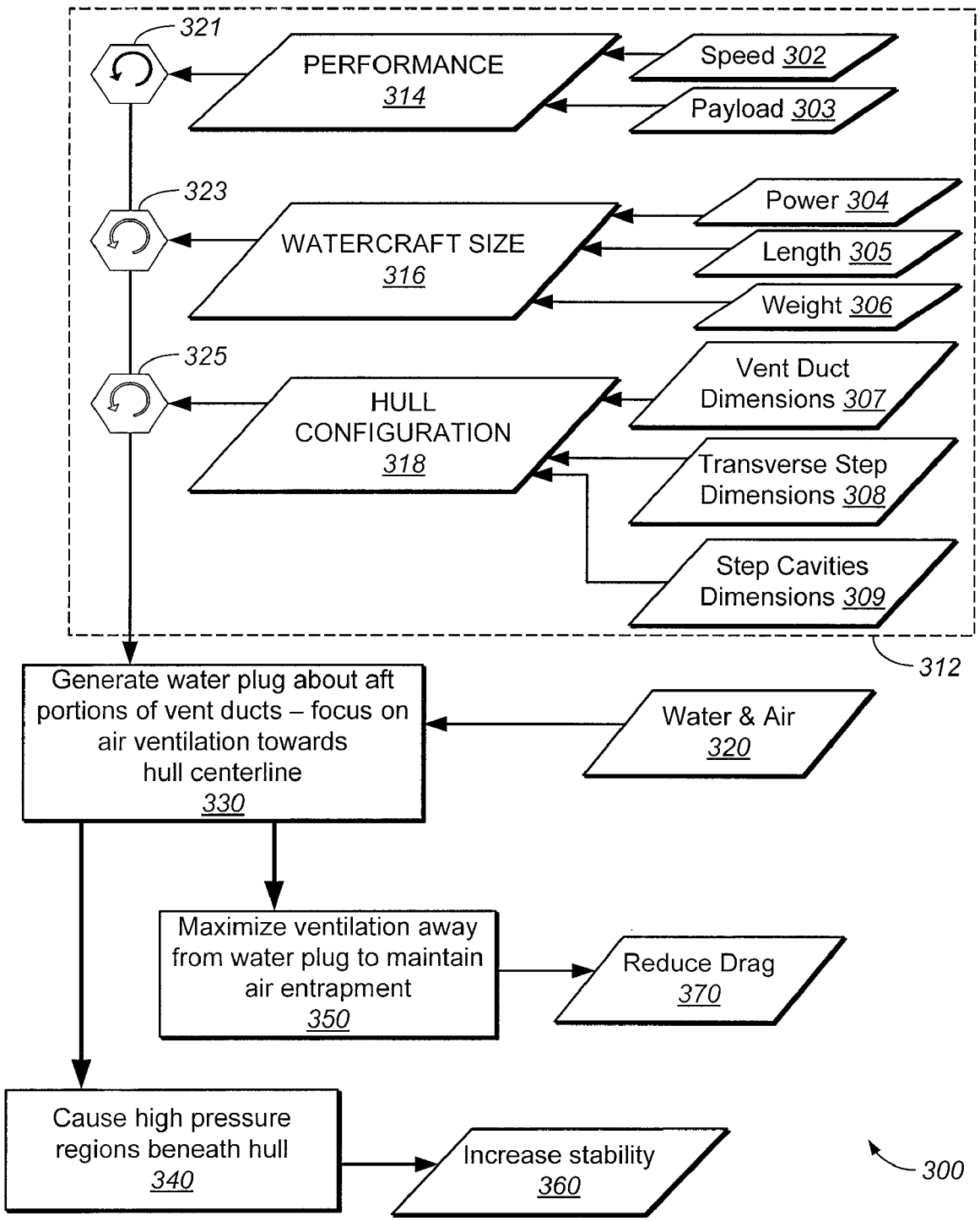
FIG. 3 illustrates a flow diagram of another method to construct a watercraft, according to at least some embodiments of the invention.

FIG. 3 illustrates a flow diagram 300 of another method to construct a watercraft, according to other embodiments of the invention. As shown, input parameters 312 include performance parameters 314, watercraft size parameters 316 and hull configuration parameters 318 coupled to variable selectors 321, 323, 325, which enable adjustability of these parameters. By way of examples, the performance parameters 314 receive a speed parameter 302 and a payload parameter 303; the watercraft size parameters 316 receive a watercraft power parameter 304, a watercraft length parameter 305, and watercraft weight parameter 306; and, the hull configuration parameters 318 receive vent duct dimensions 307, transverse step dimensions 308, and step cavities dimensions 309. In one embodiment of hull configuration 318, the watercraft comprises a center hull and two amas on either side of the center hull, with two vent ducts being formed on either side of the center hull in the space between the center hull and the amas. With transverse step dimensions 308, according to one embodiment, the center hull includes at least two transverse steps, with the steps extending from the center hull, across the vent ducts and to the inboard face of the amas. The amas, transverse steps and vent ducts can be configured for the particular watercraft length and optimized speed, using parameters 314, 316, 318 to create a pressurized vent duct. Parameters 320 involving water and air are also considered in the construction of the watercraft configured to form a pressurized vent duct that enables the divergent flow coming off of the center hull to intersect with the amas in a manner that plugs the vent duct with water 330, and in some cases, with air entrained in the water. This will focus air ventilation towards the hull centerline. The watercraft is configured so that the location of water plug should optimally be aft of the leading edge of the aft-most step, but disposed forward of the transom. The shape of the wetted areas is configured to cause the creation of the water plugs at various speeds up to the optimized speed. When the ventilation is maximized, 350, that is, to be away from the water plug and in the step cavities and on the hull running bottom, the watercraft experiences a reduction in drag, 370. When high pressure regions are formed beneath the hull, 340, the watercraft experiences increased stability, 360. It will be recognized that other embodiments exist to construct the watercraft which is configured to enable the wetted area on the hull, formed by the divergent flow coming off of the center hull which intersects with the amas in such a way as to create the water plug forward of the transom, but aft of the leading edge of the aft-most step at optimized speeds. It will be understood that the parameters shown in FIG. 3 are illustrative, and that a variety of other parameters may be considered, such as length, beam, speed, displacement and seakeeping goals.

Figure 4:
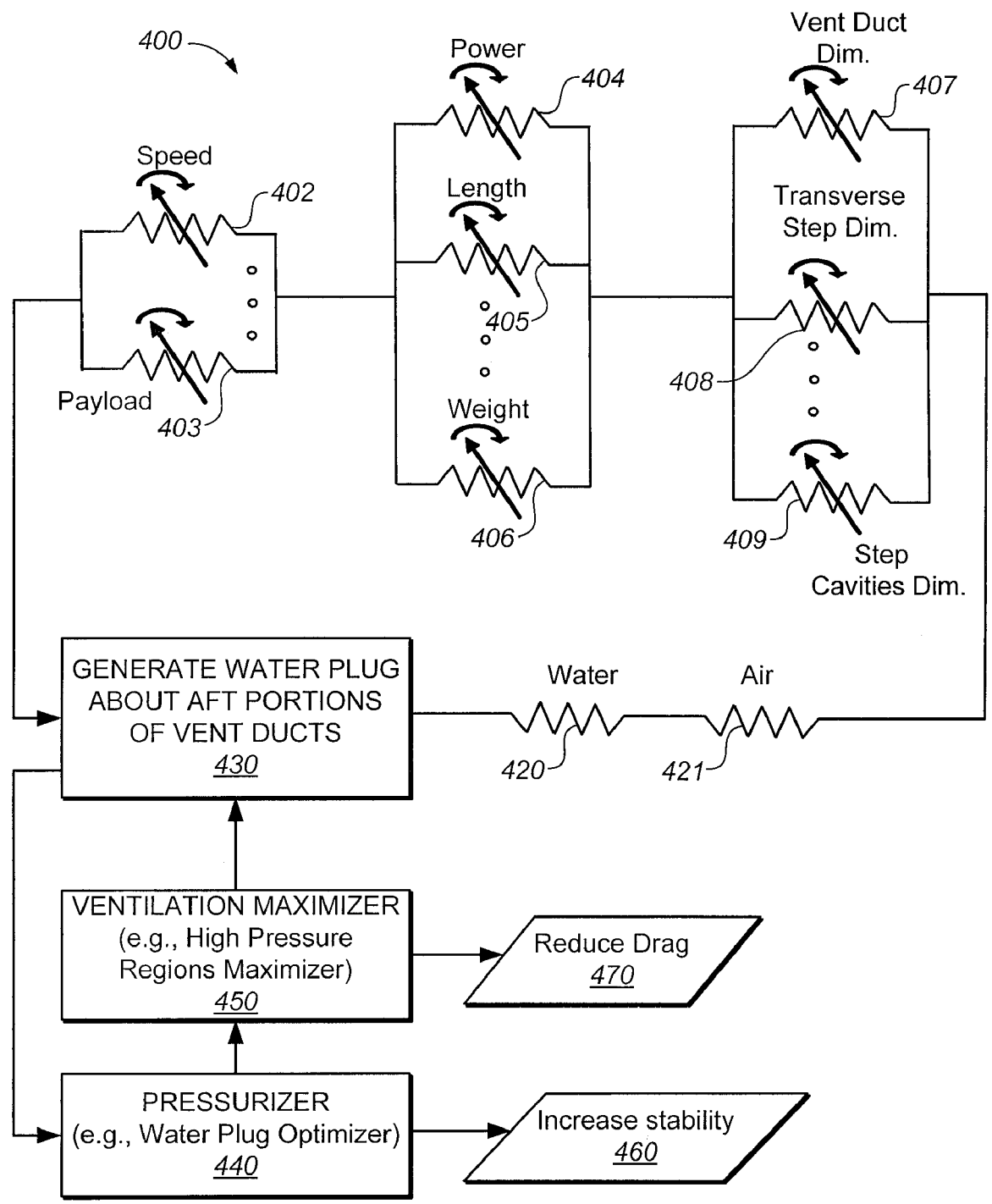
FIG. 4 illustrates a schematic diagram of a system for the flow diagram of FIG. 3, according to at least some embodiments of the invention.

FIG. 4 illustrates a schematic diagram of a system for the flow diagram of FIG. 3, according to at least some embodiments of the invention. As shown in FIG. 4, system 400 includes performance parameters that are represented by variable resistors for speed 402 and payload 403. Watercraft size parameters are represented by variable resistors for power 404, watercraft length 405 and weight 406. Hull configuration parameters are represented by variable resistors for vent duct dimensions 407, transverse step dimensions 408 and step cavities dimensions 409. An embodiment of the generator functions to enable water plugs to form at aft portions of the vent ducts 430, an embodiment of the pressurizer functions to optimize the water plug 440 for increased watercraft stability 460, and an embodiment of the ventilation maximizer functions to maximize the high pressure regions 450 to reduce drag 470. Parameters accounting for water and air are represented by resistors 420, 421, respectively.

Figure 6:
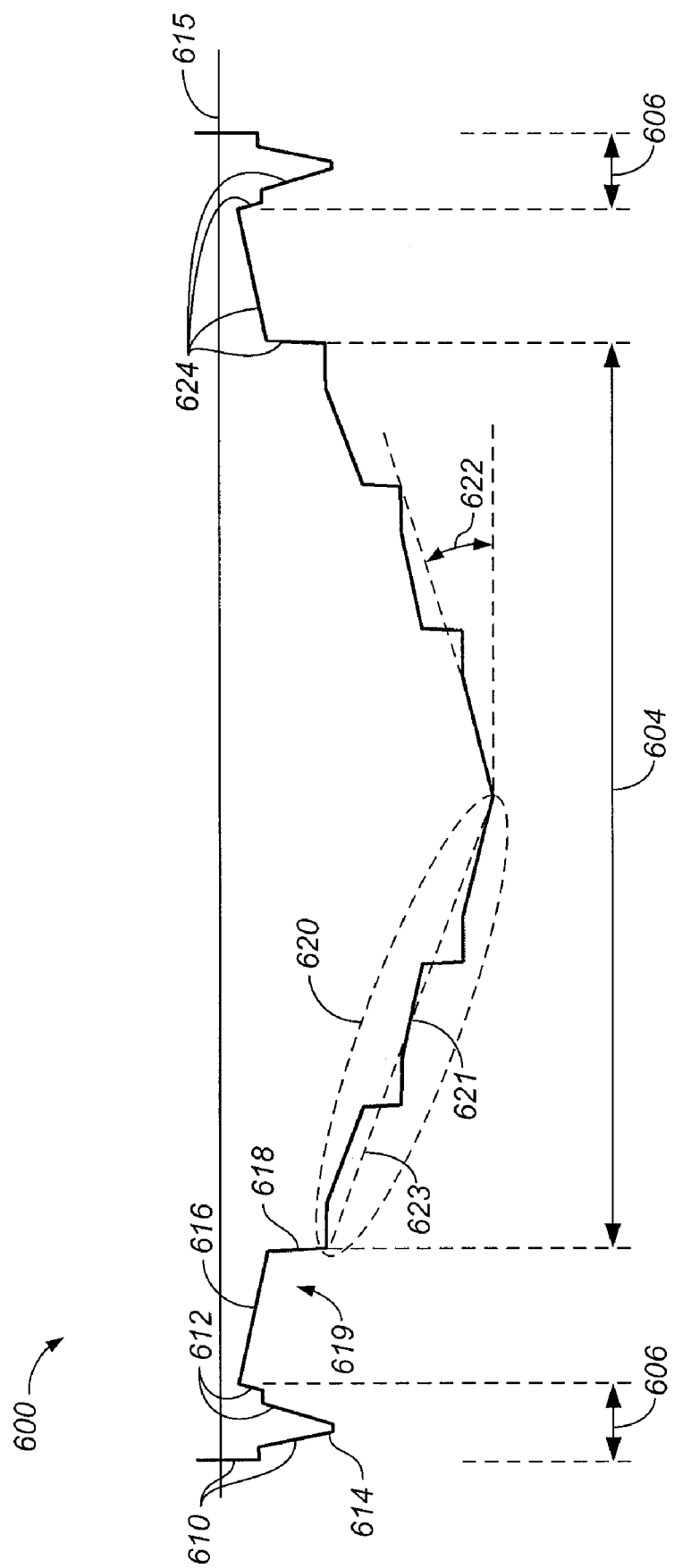
FIG. 6 is a schematic cross-section of a watercraft taken through the hull at section cut A-A of FIG. 5, according to at least some embodiments of the invention.

FIG. 6 depicts a schematic cross-section of the watercraft 500 taken through the hull at section cut A-A of FIG. 5, according to at least some embodiments of the invention. As shown, cross-section of hull 600 has a center hull having a v-shaped form 604. Side hull 606 (used interchangeably with outer hulls 606) includes outer surface portions 610 which are substantially vertical to the water surface, i.e., the static waterline 615, when the hull is at rest, and extends to lower edges, namely keel 614. The keel 614 of outer hull extends to a greater depth below the static waterline 615, than the vertical surface portions 618 of the center hull. The vertical surface portions 618 are configured to face the reverse deadrise (or inner surface) portions 612 of the side hull 606. The outer hull includes inner surface portions 612 that are disposed to face the center hull 604, and have greater reverse deadrise than the opposing surface of the center hull, namely center hull surface portions 620. Vent duct deadrise surface portion 616 (or structure forming a flat deadrise surface portion 616) is disposed between reverse deadrise portion 612 and vertical surface portion 618, and collectively is configured to form the vent duct 619. Opposing center hull surface portions 620 help form the transverse steps, and have stepped deadrise 621 in some embodiments, and an average deadrise (i.e., unstepped) 623 forming angle 622 in other embodiments. In other embodiments, the reverse deadrise decreases on the outer hulls from bow to stern.

FIG. 7 depicts an isometric bottom plan view of watercraft 700, according to at least some embodiments of the invention. Watercraft 700 includes amas 716 disposed symmetrically on either side of a center hull 704, wherein amas 716 each includes a leading edge 740 that is disposed aft of step cavity 720. A plurality of air entry points are provided, and in at least several embodiments, comprise complete step cutouts 750, 752 and 754 disposed where the step cavity intersects the side of the ama. More specifically, a step cutout is the port and starboard outboard intersection of a step cavity with a vent duct. It is noted that the definition of "complete" step cutouts refers to the ama 716 no longer being a continuous solid side hull, but as will be described below, one that includes multiple sections. As similarly depicted in FIG. 5 as three sets of transverse steps 530, 532, 534, transverse steps 730, 732, 734 are also shown in FIG. 7 Air enters the step cavities 720, 722, 724 via respective complete step cutouts 750, 752, 754. Due to the presence of amas 716, the air also travels in the vent duct until it reaches the water plug as described elsewhere herein. The presence of the water plug entraps and pressurizes the air in the vent duct forward of the water plug, as a result, increasing the pressure differential between the air in the vent duct and the air in the step cavity. The increase in pressure differential encourages more air to flow from the vent duct into a step cavity. Furthermore, the water plug and resulting pressurized air in the vent duct also keeps any air spilling out from any of the step cavities 720, 722, 724 forward of the water plug trapped on the running surfaces of the hull, as shown in FIG. 9, at least in some embodiments since the air has nowhere else to flow to.

As depicted in FIG. 7, the center hull includes a v-form with varying deadrise from the bow to at least a predetermined point forward of the stern in some embodiments, and to the transom in other embodiments. As seen more clearly in FIG. 6, the side hulls each have inner surface portions 612 facing the center hull having greater reverse deadrise than the deadrise of the opposing surface 620 of the center hull. Outer surface portions 610 are substantially vertical to the water surface 615 when the hull is at rest and extend to keel 614.

Reference will now be made to FIG. 8A, which shows a side elevation of a watercraft hull of FIG. 7, according to at least some alternate embodiments of the invention. In the embodiments of FIGS. 7 and 8A, the ama 716 has been cut out to divide the ama into three smaller areas to facilitate additional air entry points 750, 752, 754, which are disposed to coincide or intersect with a corresponding step cavity. The suction created by water separating and reattaching on the hull 800 immediately aft of a step cavity 720, 722, 724 draws air in from ambient surroundings. The complete step cutouts are configured to encourage this flow of air into the step cavities. Ventilating the step cavities is desirable to remove the suction behind each step that may create undesirable drag on the hull.

FIG. 8B shows a side elevation of a watercraft hull of FIG. 7, according to at least some alternate embodiments of the invention. In FIG. 8B, hull 802 includes a plurality of running strakes 845 that run from the bow of the center hull to a predetermined point, which in this embodiment is towards the transom. In other embodiments, the predetermined point is amidship, or some other location. Hull 802 includes a plurality of air entry points configured as partial step cutouts 850, 852, 854 that facilitate ventilation where the step cavities 820, 822, 824 intersect the side of the ama 816. Partial step cutouts 850, 852, 854 pierce through ama 816, but in contrast to those air entry points of FIGS. 7 and 8A, do not cut the ama into a plurality of sections. Those skilled in the art will understand that partial step cutouts 850, 852, 854 may be implemented by forming an opening within the ama by techniques known in the art.

Figure 10A:
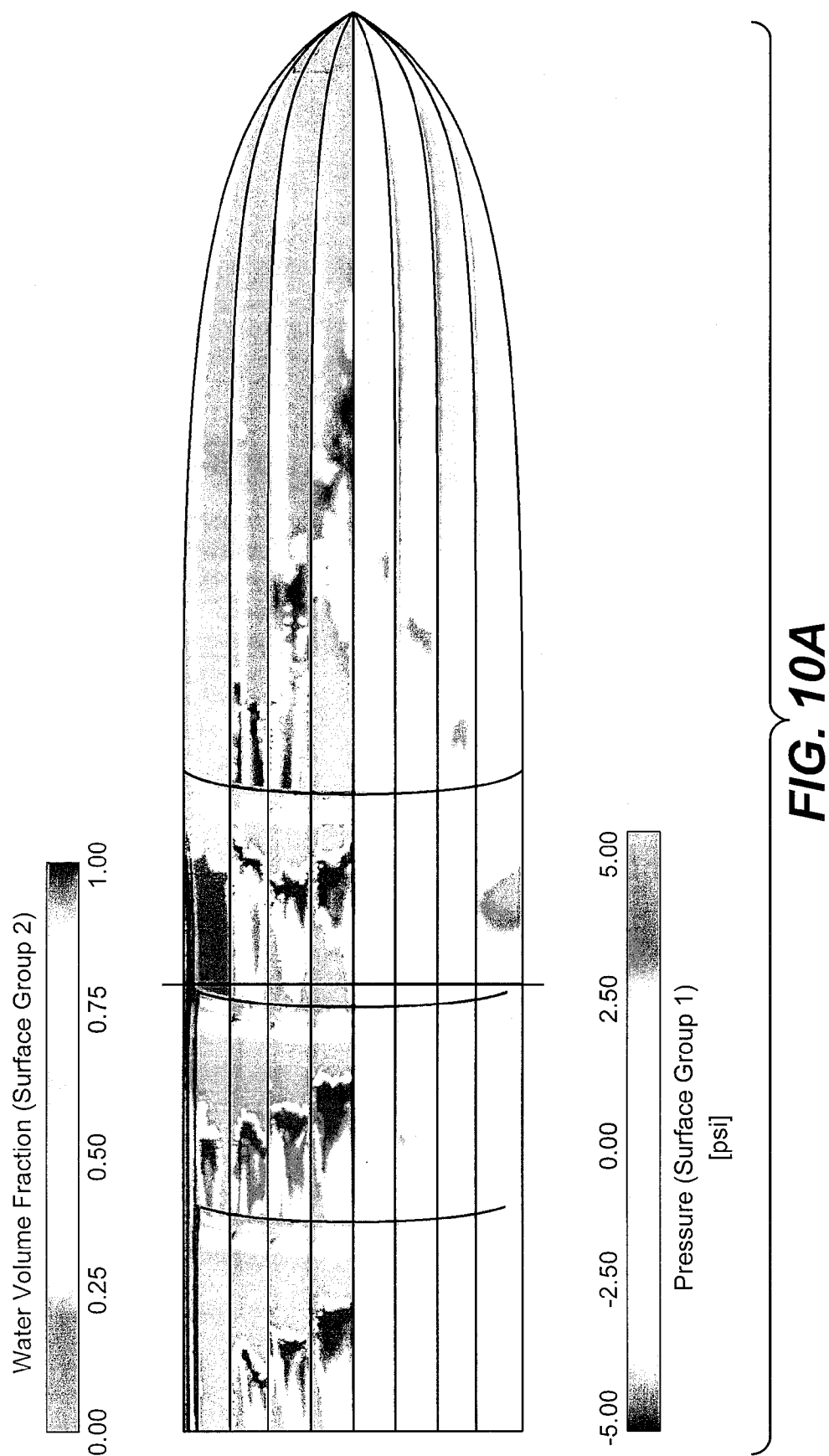
FIGS. 10A-D are exemplary models showing Water Volume Fraction and Pressure, according to at least some embodiments of the invention.
Figure 10B:
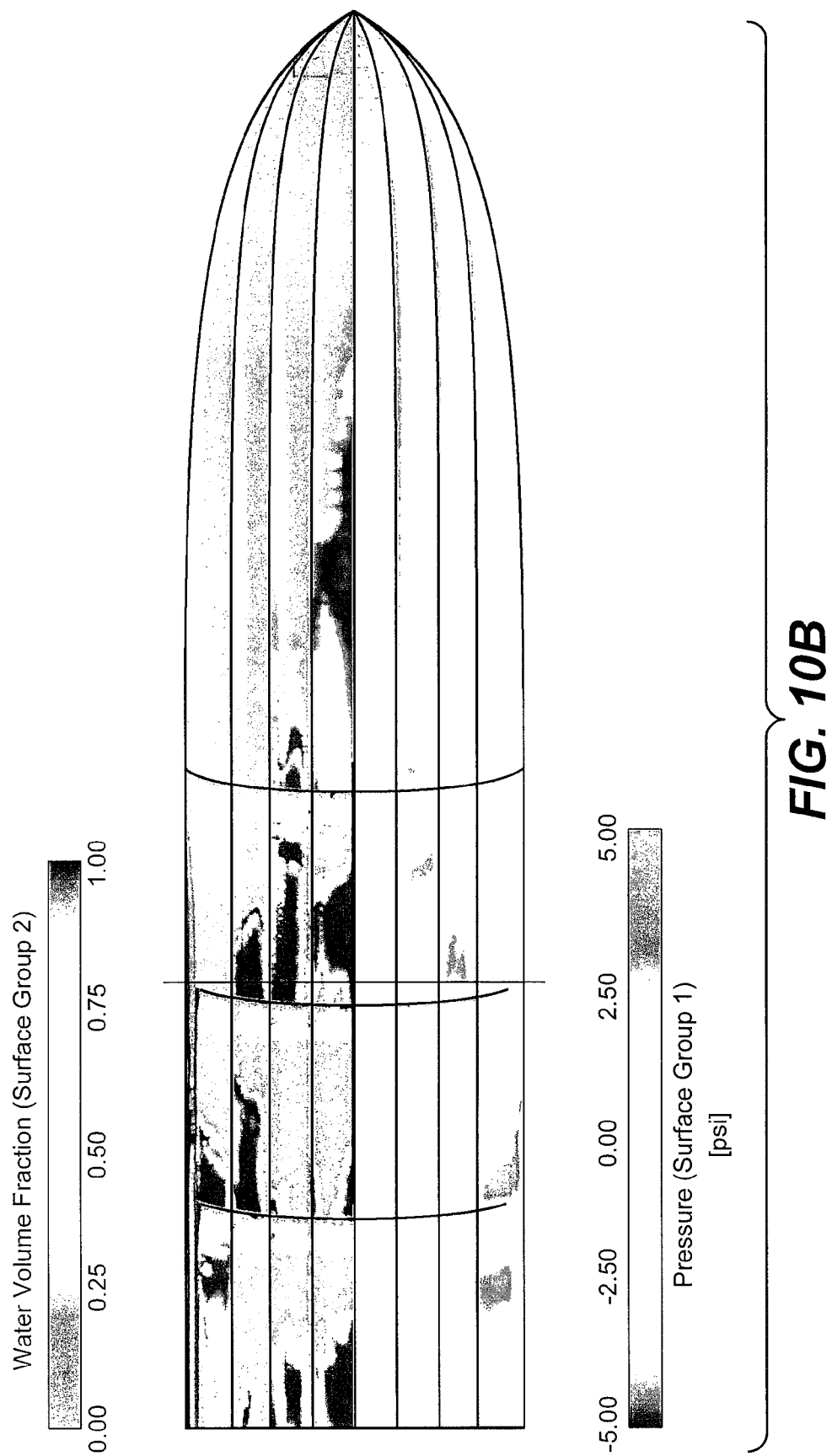
Figure 10C:
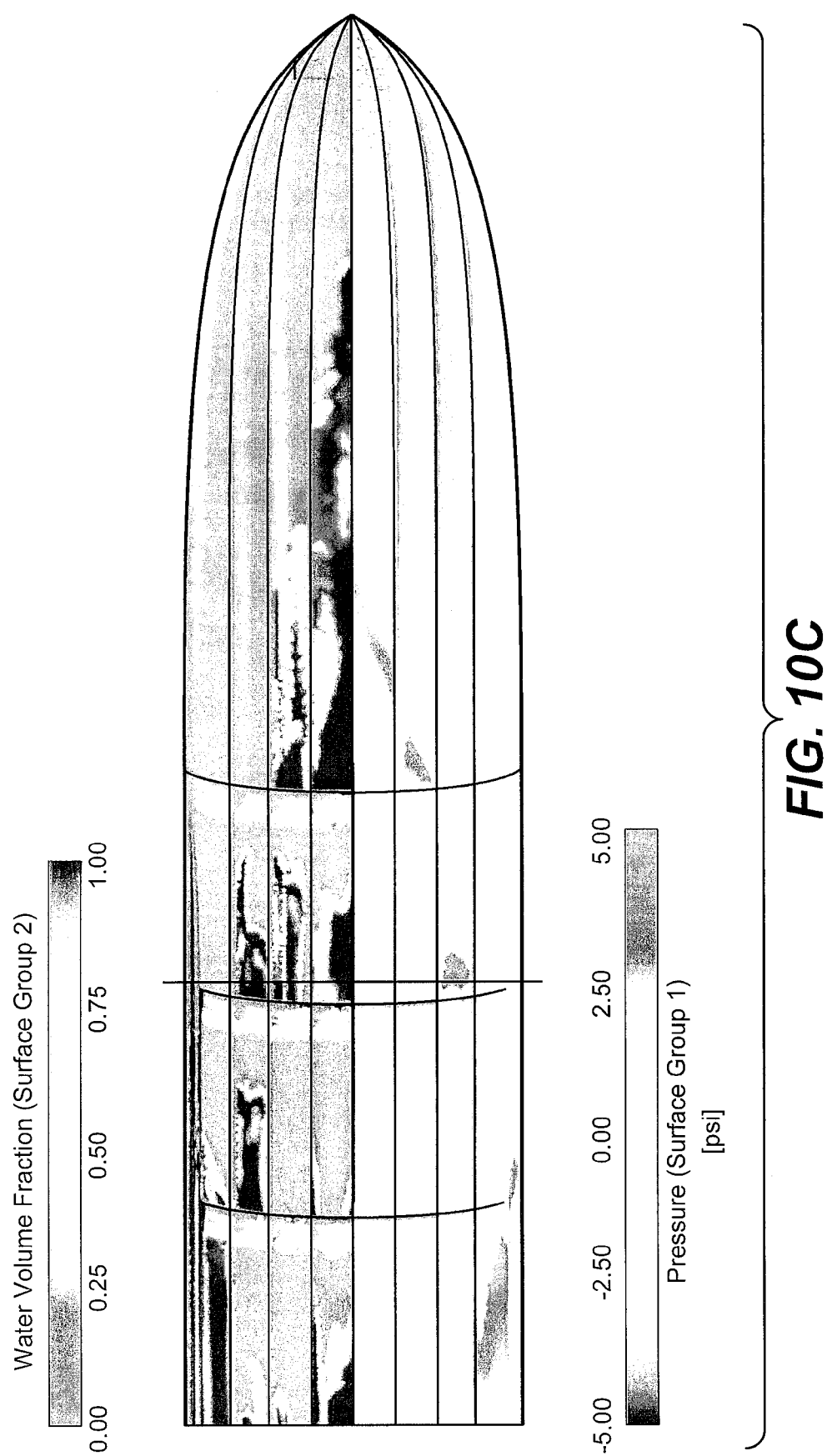
Figure 10D:
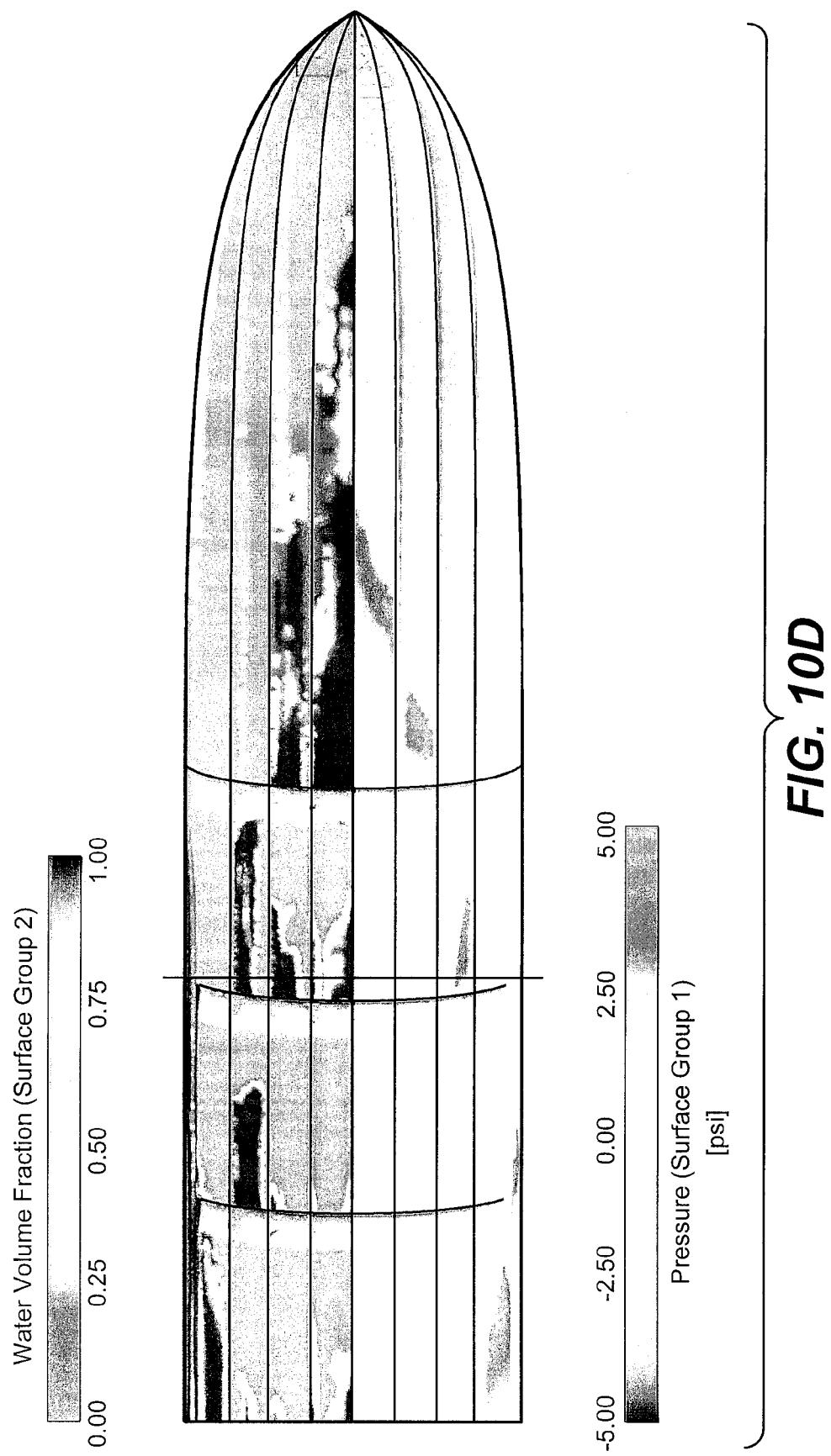
Figure 11A:
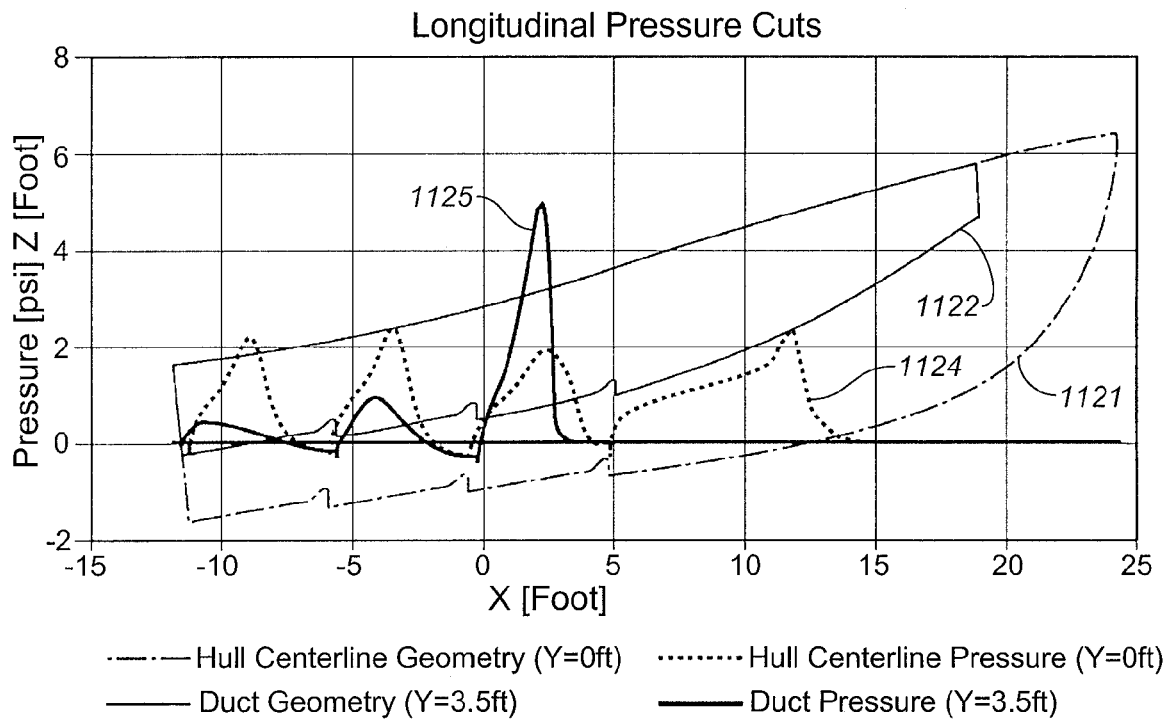
FIGS. 11A-D are exemplary models with CFD (defined below) outputs showing Longitudinal Pressure over longitudinal cuts of the craft, according to at least some embodiments of the invention.
Figure 11B:
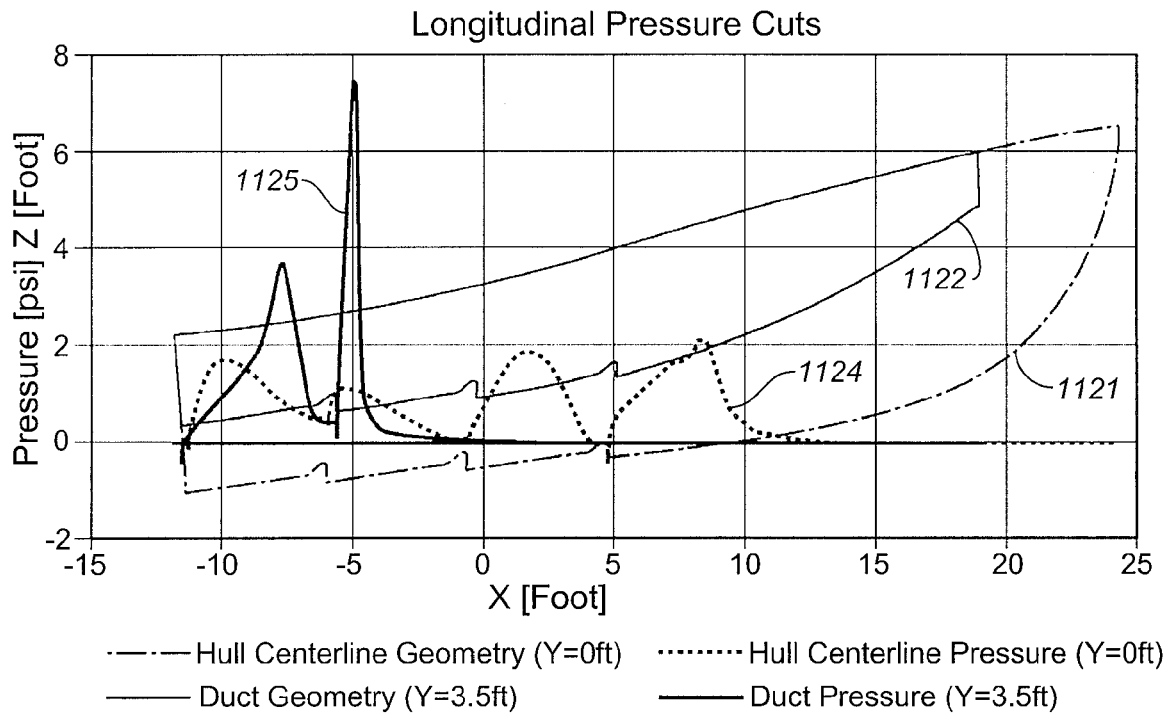
Figure 11C:
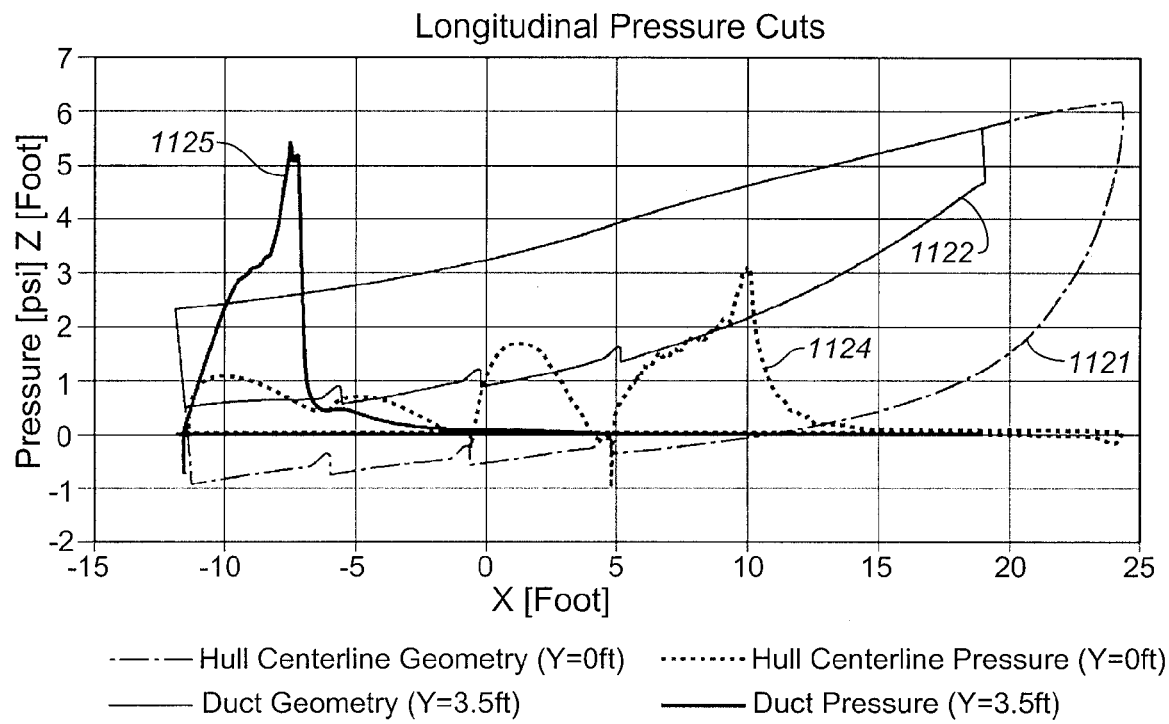
Figure 11D:
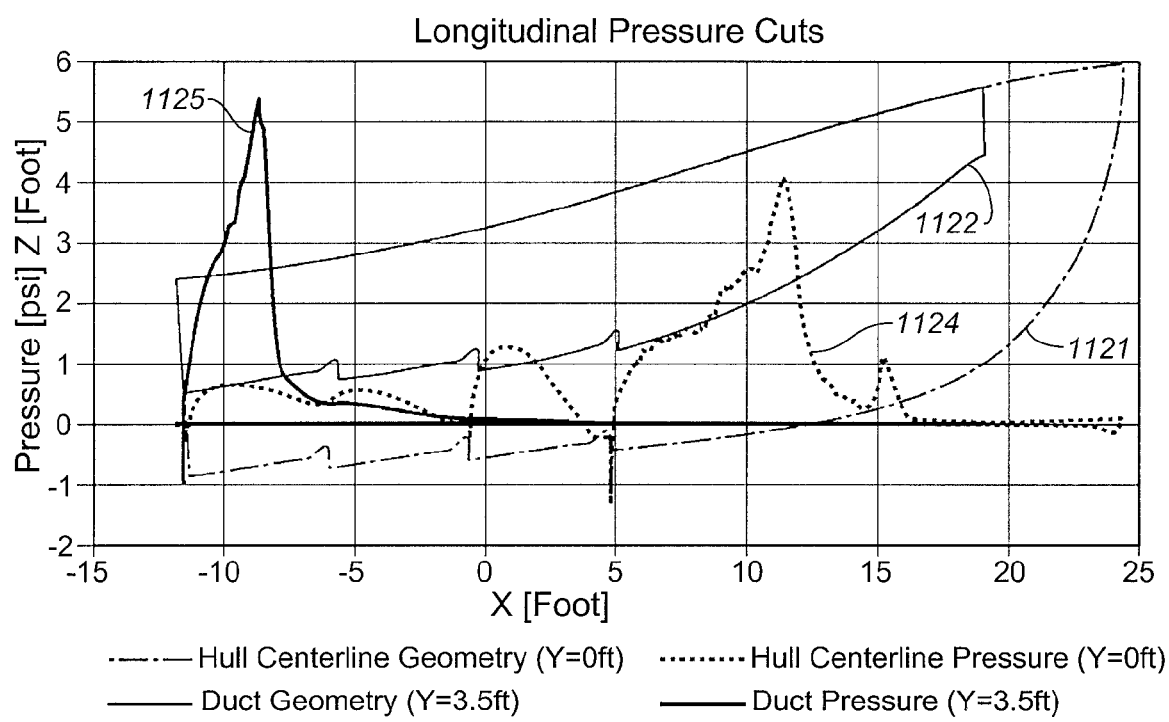

FIGS. 10A-D are exemplary models showing Water Volume Fraction and Pressure, according to at least some embodiments of the invention. FIG. 10A provides hull wetting and pressure computational fluid dynamics (CFD) modeling at watercraft speed of 30 knots, by way of example. FIG. 10B provides CFD modeling at watercraft speed of 40 knots, FIG. 10C provides CFD modeling at 50 knots, and FIG. 10D provides CFD modeling at watercraft speeds of 60 knots, by way of examples.

FIGS. 11A-D are exemplary models with CFD outputs showing pressure over longitudinal cuts of a watercraft at 30, 40, 50 and 60 knots, respectively, according to at least some embodiments of the invention. In FIGS. 11A-D, the horizontal axis represents longitudinal hull coordinates and the vertical axis represents the vertical hull coordinates and pressure. Graph 1121 represents the vertical hull coordinates, Graph 1125 represents the pressure in the vent duct, and Graph 1124 represents the pressure at the hull centerline (See FIG. 5, cross-section B-B, Hull Symmetry Axis). Graph 1122 represents the vertical hull coordinates in a plane parallel to and spaced 3.5 feet from the Hull Symmetry Plane (See FIG. 5, Section C-C, Hull Symmetry Axis Offset).

The model shows that there are four nodal pressure rises 1124 in the hull centerline as the hull is traversed along the Hull Symmetry Axis 1121, which represents the rise and fall of pressure. The forward-most peak in pressure along Hull Symmetry Axis 1121 corresponds to the stagnation point where water first contacts the hull, or the apex 70, 73, 76 of FIG. 1. The fall of pressure along the Hull Symmetry Axis 1121 corresponds to the location of the step cavities 520, 522, 524.

The model shows that there is a single significant Pressure Spike 1125 as the Hull Symmetry Axis Offset 1122 is traversed. This represents the rise in pressure in the vent duct 510 due to the water plug being formed. The location of the Pressure Spike 1125 is affected by speed. From these figures, the vent duct pressure peaks where the water plug is formed are depicted in FIGS. 11A-D, on the first step at 30 knots, corresponding to watercraft hull 60 in FIG. 1, on the second step at 40 knots, corresponding to watercraft hull 62 in FIG. 1, and on the third step at 50 and 60 knots, corresponding to watercraft hull 64 in FIGS. 1. At 30 and 40 knots, when the water plug is not yet at the ideal location, the pressure in the step cavity is virtually the same between the vent duct and hull centerline in the step cavity. At 50 and 60 knots, however, when the water plug is at its ideal location, the vent duct pressure is higher than the hull centerline pressure in the step cavity. It should be noted that a multitude of techniques may be implemented to create the water plug of the present invention, namely where both air and water are entrapped in the vent duct at optimized speed for the watercraft. For example, computer modeling may be employed, or also, hand calculations, computer software ranging from simple spreadsheets to complex CFD, model tests, or full-scale tests.

A detailed description of one or more examples is provided herein along with accompanying figures. The detailed description is provided in connection with such examples, but is not limited to any particular example. The scope is limited only by the claims, and numerous alternatives, modifications, and equivalents are encompassed. Numerous specific details are set forth in the description in order to provide a thorough understanding. These details are provided as examples and the described techniques may be practiced according to the claims without some or all of the accompanying details. They are not intended to be exhaustive or to limit the invention to the precise forms disclosed, as many alternatives, modifications, equivalents, and variations are possible in view of the above teachings. For clarity, technical material that is known in the technical fields related to the examples has not been described in detail to avoid unnecessarily obscuring the description.

The various examples of the invention may be implemented in numerous ways, including as a system, a process, and apparatus. In general, the flows of disclosed processes may be performed in an arbitrary order, unless otherwise provided in the claims.

The description, for purposes of explanation, uses specific nomenclature to provide a thorough understanding of the invention. However, it will be apparent that specific details are not required in order to practice the invention. In fact, this description should not be read to limit any feature or aspect of the present invention to any embodiment; rather features and aspects of one example can readily be interchanged with other examples. Notably, not every benefit described herein need be realized by each example of the present invention; rather any specific example may provide one or more of the advantages discussed above. In the claims, elements and/or operations do not imply any particular order of operation, unless explicitly stated in the claims. It is intended that the following claims and their equivalents define the scope of the invention.

What is claimed is:

1. A watercraft comprising a center hull and a pair of outer side hulls respectively located on opposite sides of the center hull and including outer surfaces forming portions of the outer sides of the watercraft, said center hull having a v-form including varying deadrise from the bow to at least a predetermined point forward of the stem, and said side hulls each having inner surface portions facing the center hull having greater reverse deadrise than the deadrise of the opposing surface of the center hull; said outer surfaces of the side hulls being substantially vertical to the water surface when the hull is at rest and extend to a lower keel; said center hull also having vertical surface portions facing the reverse deadrise surface portions of said outer hulls; and having a vent duct deadrise surface structure between the center hull and side hull forming a flat deadrise surface portion extending from said center hull vertical surface portions and intersecting with the reverse deadrise surface portion of an adjacent outer hull on each side of center hull, whereby said center hull vertical surface portions, side hull reverse deadrise surfaces and vent duct deadrise surface portions define a vent duct on each side of the center hull; and said center hull having at least two transverse steps that extend from the center hull across the vent duct deadrise surface portions on either side of the center hull, to end at the inner surfaces of the side hull; wherein said outer hulls include lower edges extending to a greater depth below the waterline than said vertical surface portions of the center hull.

2. The watercraft of claim 1, wherein the pair of outer side hulls each comprises a plurality of air entry points, disposed to intersect with respective step cavities defined along the center hull.

3. The watercraft of claim 2, wherein the air entry points comprise cut outs.

4. The watercraft of claim 2, wherein the air entry points comprise partial step cutouts that pierce said side hulls.

5. The watercraft of claim 2, wherein said air entry points comprise three per each side hull.

6. The watercraft of claim 1, wherein the vent duct is configured to allow formation of a water plug that prevents ventilation of the vent duct.

7. The watercraft of claim 6, wherein the vent duct is configured to cause pressurization at the fore of the water plug.

8. The watercraft of claim 6, further comprising a plurality of step cavities disposed along a running bottom of the center hull, wherein each step cavity is configured to receive air ventilated from the vent ducts so that certain portions of the vent duct remain dry, and said step cavity being configured to direct the air away from the water plug and through the running bottom.

9. The watercraft of claim 1, wherein the center hull and side hulls include aft transom portions.

10. The watercraft of claim 9, further comprising an engine coupled to the transom portions.

11. The watercraft of claim 1, further comprising a plurality of running strakes disposed on a bow of the center hull and running therefrom to a predetermined point amidship.

12. A watercraft comprising a center hull and a pair of side hulls respectively located on opposite sides of the center hull and including outer surfaces forming portions of the outer sides of the watercraft, said center hull having a v-form including varying deadrise from the bow to at least a predetermined point forward of the stern, and said side hulls each having inner surface portions facing the center hull having greater reverse deadrise than the deadrise of the opposing surface of the center hull; said center hull also having vertical surface portions facing the reverse deadrise surface portions of said outer hulls; said center hull including a deadrise surface portion on each of its sides extending from said vertical surface portions and intersecting with the reverse deadrise surface portion of its adjacent outer hull; and said center hull including a running bottom with a plurality of step cavities disposed therein, whereby said vertical surface portions, reverse deadrise surface portions and deadrise surface portions define a vent duct on each side of the center hull, each said vent duct including a plurality of air entry points configured to encourage intake of air flow that pressurizes the vent duct and that ventilates through the step cavities and onto the running bottom.

13. The watercraft of claim 12, wherein the air entry points comprise cut outs.

14. The watercraft of claim 12, where the air entry points comprise partial step cutouts that pierce said side hulls.

15. The watercraft of claim 1, wherein the pair of outer side hulls each comprises at least one air entry point disposed to intersect with a respective step cavity defined along the center hull.

16. The watercraft of claim 1, wherein the vent duct is configured to allow formation of a water plug that blocks air from flowing out of aft portions of the vent duct.

17. The watercraft of claim 16, wherein the vent duct is configured to cause pressurization forward of the water plug.

18. The watercraft of claim 1, further comprising at least one running strake disposed longitudinally from the bow of the center hull and running aft therefrom towards a transom.

19. The watercraft of claim 1, further comprising at least one running strake disposed longitudinally from the bow of the center hull and running aft therefrom towards a predetermined point forward of the transom.

20. A method of constructing a watercraft having a center hull and two outer hulls disposed about either side of the center hull to form respective vent ducts there between, the method comprising:
  integrating a plurality of parameters indicative of aspects related to the watercraft to allow formation of wetted areas at the vent ducts;
  forming the vent ducts to be in communication with a plurality of step cavities in order to cause the wetted areas to pressurize the vent ducts; and
  configuring certain portions of the vent ducts to remain dry by enabling ventilation of the vent ducts away from the wetted areas, through the plurality of step cavities and onto a running bottom of the center hull,
wherein integrating a plurality of parameters comprises determining air and water intake parameters that influence operation of the vent ducts, and determining points within the vent ducts to form said wetted areas that block the air from flowing out of aft portions of the vent ducts.

21. A method of constructing a watercraft having a center hull and two outer hulls disposed about either side of the center hull to form respective vent ducts there between, the method comprising:
  integrating a plurality of parameters indicative of aspects related to the watercraft to allow formation of wetted areas at the vent ducts;
  forming the vent ducts to be in communication with a plurality of step cavities in order to cause the wetted areas to pressurize the vent ducts;
  configuring certain portions of the vent ducts to remain dry by enabling ventilation of the vent ducts away from the wetted areas, through the plurality of step cavities and onto a running bottom of the center hull;
  enabling the wetted areas to form water plugs at aft portions of the vent ducts; and
  enabling peak pressure to be attained at aft-most and widest points on the watercraft.

22. The method of claim 21, wherein the watercraft is configured to attain increased stability, responsive to enabling the peak pressure.

* * * * *